Nov. 10, 1964  G. R. WELTI  3,156,914
TRANSMISSION AND RECEPTION OF RADAR SIGNALS
Filed April 29, 1960  10 Sheets-Sheet 7

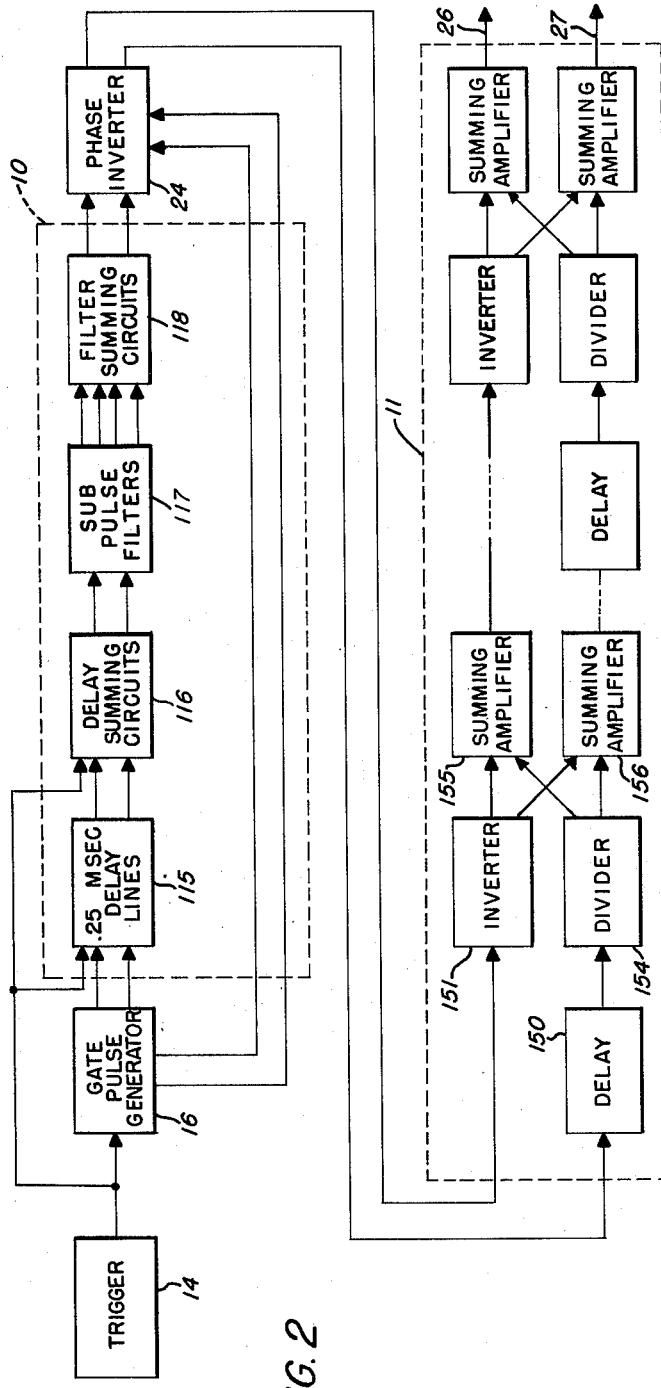
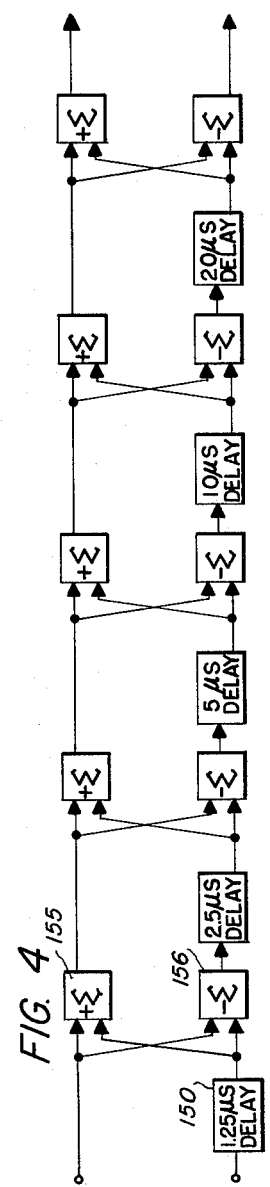
FIG. 2
FIG. 4
INVENTOR
GEORGE R. WELTI
BY
ATTORNEY

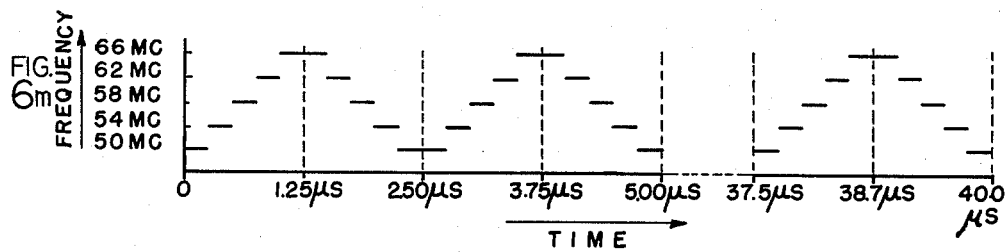
FIG. 6 (CONT'D)
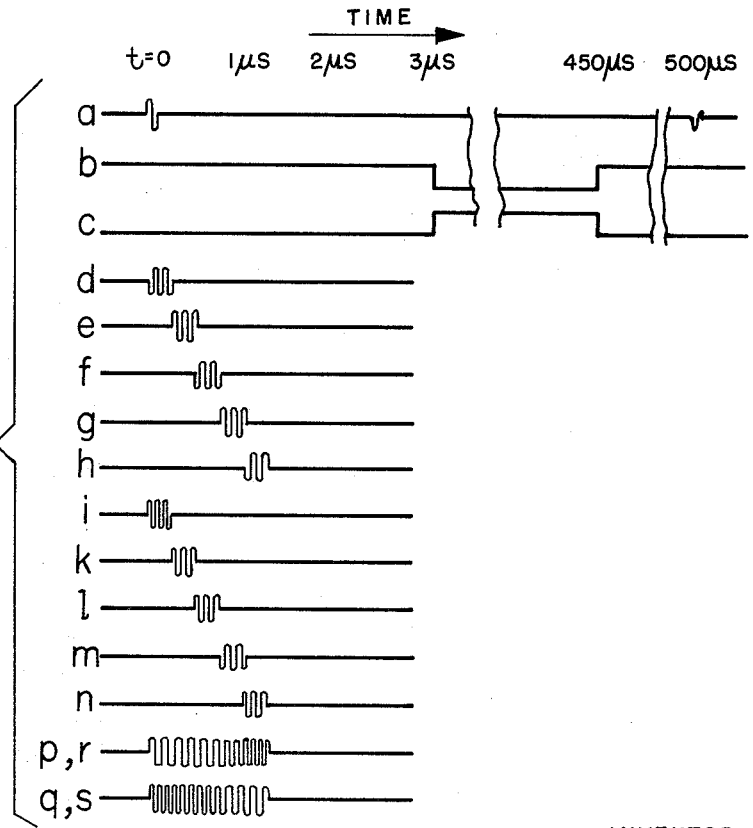

INVENTOR
GEORGE R. WELTI
BY Joseph D. Pannone
ATTORNEY

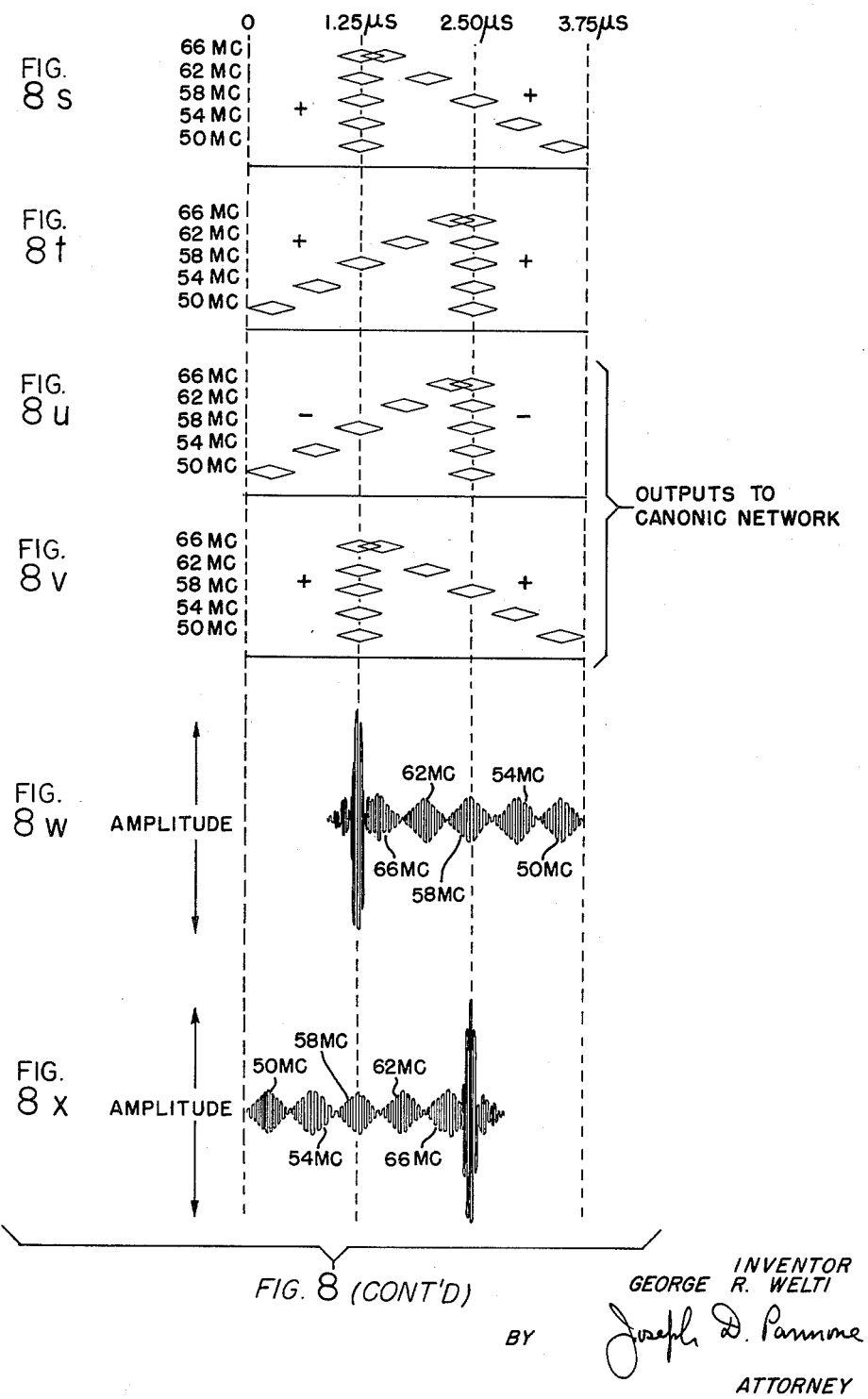

3,156,914
TRANSMISSION AND RECEPTION OF
RADAR SIGNALS
George R. Welti, Newton, Mass., assignor to Raytheon
Company, Lexington, Mass., a corporation of Delaware
Filed Apr. 29, 1960, Ser. No. 25,775
19 Claims. (Cl. 343—17.1)

This invention relates generally to the transmission and reception of signals, and more particularly, to a radar signal system utilizing pulse coding of a signal having a predetermined waveform for increasing radar bandwidth to provide greater range accuracy and resolution and increased average power capabilities of radar systems.

As is known, long-range detection of radar targets requires the use of high power radars and, hence, the use of transmitted pulses having large energy content. Such a requirement usually involves high peak powers and large pulse widths. However, if large pulse widths are used, the range accuracy and resolution of the radar system generally deteriorates. The range resolution of a radar, that is, the minimum range difference at which two equal point targets can be resolved, is inversely proportional to the spectral bandwidth of the transmitted waveform. Range accuracy, that is, the standard deviation of range error, is also inversely proportional to the spectral bandwidth. One way to achieve a large spectral bandwidth is to divide or code the pulse of a radar system into a sequence of a plurality of contiguous subpulses of the same frequency and of random phase, the bandwidth of the resulting waveform, in cycles per second, being the reciprocal of the subpulse duration. Hence, the time-bandwidth product, that is, the product of the duration and spectral bandwidth of the waveform is then equal to a number of subpulses.

In accordance with this invention, a waveform is composed of a series of discrete subpulses, each successive one of which has a frequency which differs from the preceding subpulse by a fixed amount, so that the frequency versus time plot of the waveform appears substantially in the shape of an ascending staircase waveform. A successive ascending and descending staircase waveform is fed to a delay network which preserves the bandwidth of the staircase waveform and doubles the length for each section in the delay network, the time-bandwidth product or pulse compression ratio is further multiplied by $2^n$ where $n$ is the number of sections in the delay network.

The present invention further provides a radar system which codes or divides the transmitted pulse waveform into a relatively large number of subpulses in order to achieve a large time-bandwidth product and to decode or reprocess these pulses during a receiving mode in order to achieve high resolution and reduced ambiguous subpulse by-products of the pulse compression. Such a system is made possible by the generation of a particularly unique waveform for the transmitted signal and the subsequent unique processing of the received signal.

In the system of the invention, the aforementioned ascending and descending staircase waveforms are generated and fed to a time delay network capable of generating arbitrarily long pulses of a given bandwidth. This network, which comprises a delay line, an inverter, divider, and two summing circuits for each section is herein referred to as a "canonic network." This network, and the aforementioned apparatus for generating the staircase waveforms hereinafter referred to as the "input filter" are used in connection with each other in both the transmitting and receiving mode of operation of the radar system. After transmission of a coded waveform from this network, the received coded pulses are recirculated through the input filter and canonic network, which becomes a matched filter for the received pulses, to recombine the sequence of pulses into a single composite pulse having an amplitude many times greater than any of the individual pulses. This operation, generally referred to as pulse compression, can be incorporated into a radar system and for each additional stage added to the canonic network, the pulse length becomes doubled. In this manner, high compression ratios of $2^{nP}$ can be achieved in a novel manner by the addition of each stage to the canonic network, where $n$ is the number of stages or network sections and P is the time-bandwidth product of the input filter impulse response and increased radar bandwidth and range resolution and accuracy are achieved for any given peak power.

In the broader aspect, the invention contemplates a system using a particular novel class of quaternary codes which can be generated by the following set of rules and which exhibit certain advantageous properties in the communication and radar fields. A code is defined herein as a specified sequence of $2^n$ symbols selected from an alphabet of four symbols: $a$, $b$, $\underline{a}$, $\underline{b}$. For $n$ equal to 1, there is just one code (a b). For $n$ greater than 1, there are $2^{n-1}$ codes; thus, there are 2 codes of length 4, 4 codes of length 8, 8 codes of length 16, etc.

When a code of any length $2^n$ is given, two codes of twice that length, or length $2^{n+1}$, can be found by repeating the given code twice and interchanging the underbars in either the third quarter or the fourth quarter of the resulting sequence. Thus, from $(a\ b)$ one obtaining either $(a\ b\ \underline{a}\ b)$ or $(a\ b\ a\ \underline{b})$, and from the latter, one obtains either $(a\ b\ a\ \underline{b}\ \underline{a}\ \underline{b}\ a\ \underline{b})$ or $(a\ b\ a\ \underline{b}\ a\ b\ \underline{a}\ b)$. To such distinct codes whose leading halves are identical are called mates herein. With every pair of codes of equal length we associate a crosscorrelation function (if the two codes of the pair are different) or an autocorrelation function (if they are identical). The cross- or autocorrelation function is a sequence of numbers obtained by summation of products of corresponding symbols when one code is shifted, one symbol space at the time, past the other, where the product rule is $$a\times a = b\times b = 1,\ a\times \underline{a} = b\times \underline{b} = -1,$$
$$a\times b = a\times \underline{b} = \underline{a}\times b = \underline{a}\times \underline{b} = 0$$

For example, the crosscorrelation function of $(a\ b\ a\ \underline{b}\ \underline{a}\ \underline{b}\ a\ \underline{b})$ and $(a\ b\ a\ \underline{b}\ a\ b\ \underline{a}\ b)$ is $(0, 0, 0, -4, 0, 0, 0, 0, 0, 0, 0, 4, 0, 0, 0)$ and is found by the procedure illustrated below:

```
a  b  a  b  a  b  a  b
            a  b  a  b  a  b  a  b
            0                            =0 a  b  a  b  a  b  a  b
         a  b  a  b  a  b  a  b
         1—1                             =0
```

$$a\ b\ a\ \underline{b}\ \underline{a}\ \underline{b}\ a\ \underline{b}$$
$$a\ b\ \underline{a}\ b\ a\ b\ a\ \underline{b}$$
$$0\ +\ 0\ +\ 0\quad\ =0$$

$$a\ b\ a\ \underline{b}\ \underline{a}\ \underline{b}\ a\ \underline{b}$$
$$\underline{a}\ b\ \underline{a}\ \underline{b}\ a\ b\ a\ \underline{b}$$
$$-1-1-\overline{1}-1\quad\ =-4$$

$$a\ b\ a\ \underline{b}\ \underline{a}\ \underline{b}\ a\ \underline{b}$$
$$a\ b\ \underline{a}\ b\ a\ b\ a\ \underline{b}$$
$$0+0+0+0+0\quad =0$$

$$a\ b\ a\ \underline{b}\ \underline{a}\ \underline{b}\ a\ \underline{b}$$
$$a\ \underline{b}\ \underline{a}\ b\ a\ b\ a\ b$$
$$1-1+1-1+1-1\quad =0$$

$$a\ b\ a\ \underline{b}\ \underline{a}\ \underline{b}\ a\ \underline{b}$$
$$a\ b\ \underline{a}\ \underline{b}\ \underline{a}\ b\ a\ \underline{b}$$
$$0+0+0+0+0+0+0\quad =0$$

$$a\ b\ a\ \underline{b}\ \underline{a}\ \underline{b}\ a\ \underline{b}$$
$$a\ b\ \underline{a}\ b\ \underline{a}\ b\ a\ b$$
$$1+1-1-1-1-1+1+1\quad =0$$

$$a\ b\ a\ \underline{b}\ \underline{a}\ \underline{b}\ a\ \underline{b}$$
$$a\ b\ \underline{a}\ b\ \underline{a}\ b\ a\ b$$
$$0+0+0+0+0+0+0\quad =0$$

$$a\ b\ a\ \underline{b}\ \underline{a}\ \underline{b}\ a\ \underline{b}$$
$$a\ b\ a\ b\ a\ b\ a\ \underline{b}$$
$$-1+1+1-1-1-1+1\quad =0$$

$$a\ b\ a\ \underline{b}\ \underline{a}\ \underline{b}\ a\ \underline{b}$$
$$a\ b\ \underline{a}\ b\ a\ b\ a\ \underline{b}$$
$$0+0+0+0+0\quad =0$$

$$a\ b\ a\ \underline{b}\ \underline{a}\ \underline{b}\ a\ \underline{b}$$
$$a\ b\ \underline{a}\ b\ a\ b\ a\ \underline{b}$$
$$1+1+1+1\quad =4$$

$$a\ b\ a\ \underline{b}\ \underline{a}\ \underline{b}\ a\ \underline{b}$$
$$a\ b\ \underline{a}\ b\ a\ b$$
$$0+0+0\quad =0$$

$$a\ b\ a\ \underline{b}\ \underline{a}\ \underline{b}\ a\ \underline{b}$$
$$a\ b\ \underline{a}\ b\ a\ b\ \underline{b}$$
$$1-1\quad =0$$

$$a\ b\ a\ \underline{b}\ \underline{a}\ \underline{b}\ a\ \underline{b}$$
$$a\ b\ \underline{a}\ b\ a\ b\ \underline{b}$$
$$0\quad =0$$

Codes constructed with the aforementioned rules have the following four advantageous properties. First, their autocorrelation functions have a central term equal to $2^n$ and all other terms equal to zero. Second, the crosscorrelation functions of mates have all terms equal to zero. Third, the crosscorrelation functions of two different codes of the same length have their central term equal to zero. Fourth, if any code ending in $b$ is written backwards, and the symbols $a$, $b$, $\underline{a}$, and $\underline{b}$ are replaced by $\underline{b}$, $a$, $b$, $\underline{a}$, respectively, the mate of the original code is obtained. For example, starting with the code $(a\ b\ a\ \underline{b}\ a\ b\ \underline{a}\ b)$ one obtains by inversion $(b\ \underline{a}\ b\ a\ \underline{b}\ a\ b\ a\ )$ and by replacement $(a\ b\ a\ \underline{b}\ \underline{a}\ b\ a\ \underline{b})$ which is the mate of the starting code.

In the present physical embodiment of a system utilizing the quaternary code of this invention, the symbols $a$ and $b$ designate upstairs and downstairs in the transmitted waveform, respectively, and the underbar designates the phase reversal of the frequencies of a staircase. The first and fourth of the aforementioned code properties are used advantageously to achieve compressed pulses free from ambiguous peaks and to achieve a matched-filter condition in the receive mode, respectively. The canonic network is a physical embodiment of the aforementioned rule for code generation. In other applications, such as communications systems, the second and third aforementioned properties of the code can be exploited advantageously.

Further objects and advantages of this invention will be apparent as the description thereof progresses, reference being had to the accompanying drawings, wherein:

FIG. 2 is a block diagram of an input filter and canonic network;

FIG. 4 is a diagram representation of the functions of the canonic network;

FIG. 5 and FIG. 6 show input filter waveforms during the transmit mode of operation;

Figure 1:
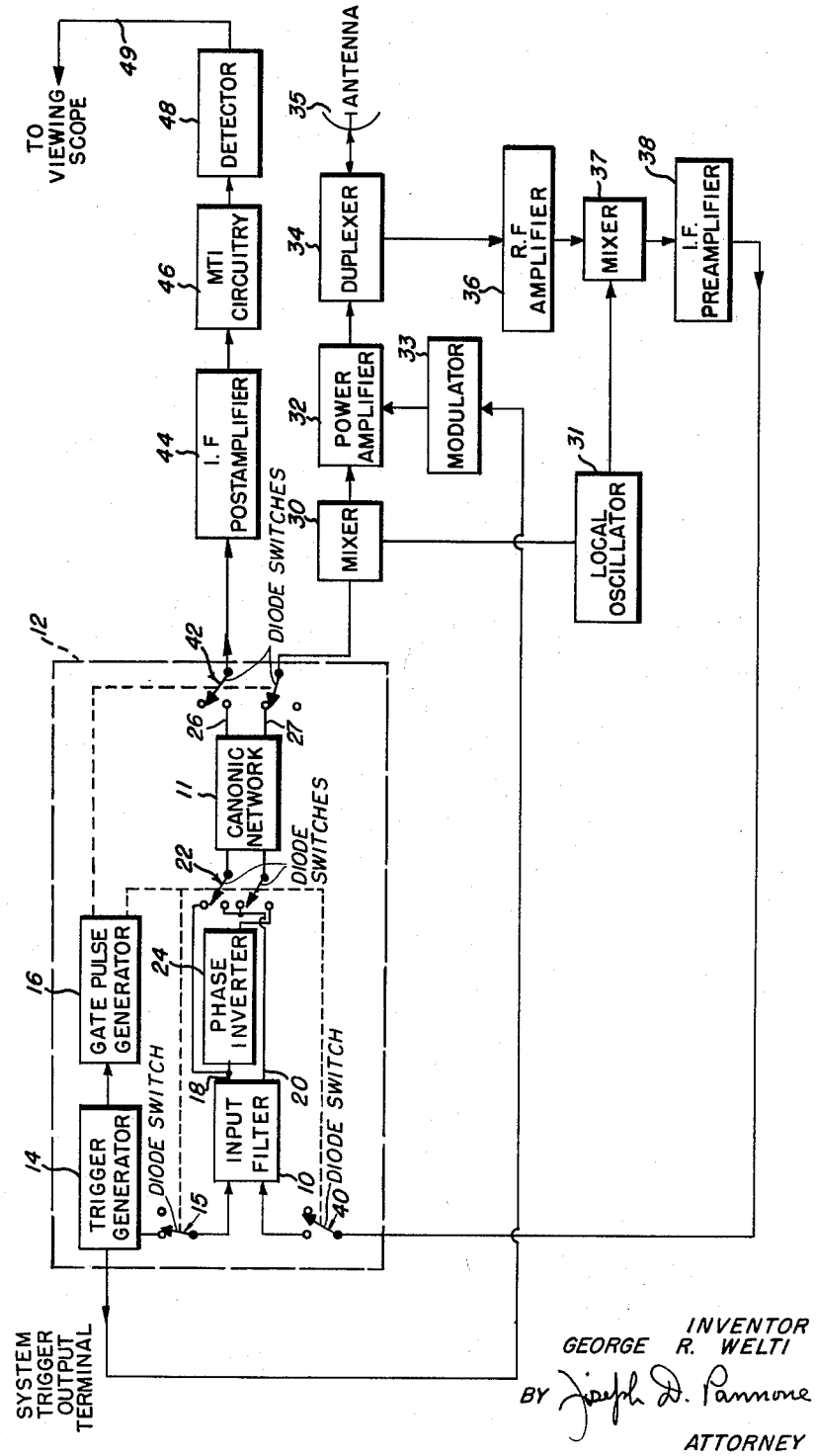
FIG. 1 is a block diagram of a pulse compression system incorporated in a system for transmitting and receiving radar signals.

Referring to FIG. 1, there is shown a block diagram of a radar system incorporating an input filter 10 and canonic network 11, which form that which is referred to as a quaternary coded pulse compression system 12 to achieve a high pulse compression ratio. In particular, a trigger generator 14 generates a trigger pulse, as shown in FIG. 5a, which is applied in the transmitting mode to the input filter which forms both the ascending and descending staircase waveforms by way of a diode switch, or well known diode transmission gate, 15 which is closed during the transmit mode. The trigger generator also applies a trigger pulse, delayed by 3 microseconds, not shown, to a conventional gate pulse generator 16, which generates a pair of gating signals shown in FIGS. 5b and 5c, for rendering the appropriate diode gates or switches conductive or nonconductive during the transmit and receive mode. During the transmit mode, diode gating switch 15 is closed by a gate pulse from gate pulse generator 16 to apply repetitive pulses, with a single pulse during each transmit mode, to the input filter, each of which generates an ascending stair on output line 18 and a descending stair on output line 20. These upstair and downstair waveforms are applied to the canonic network. The downstair and the upstair are connected through double-pole double-throw diode switch 22 to the canonic network, switch 22 selecting the line 18 directly in the transmit mode and reversing lines 18 and 20 in the receive mode. A well-known inverter amplifier 24 is used to invert the signal on line 18 during receive. In this manner, ascending and descending staircase waveforms occurring simultaneously are fed to the input section of the canonic network. A generalized block diagram of the canonic network is shown in FIG. 4 and its operation will be later described in detail with reference to FIGS. 2 and 7.

The canonic network 11, during the transmit mode, converts the single up and down staircase waveforms into a continuous succession of alternate up-and-down staircase waveforms by progressively delaying these waveforms for longer periods of time and recombining them into a continuous train of staircase waveforms. It also inverts the phase of selected staircase waveforms to form the final coded output signals on lines 26 and 27. This coded output signal is a combination of four distinct waveforms caused by the inversion or absence of inversion of the ascending and descending staircase waveforms to provide a quaternary code, that is, a code composed of four variables. The phase of the waveforms or signals referred to throughout the specification and claims is the phase of the amplitude sine waves at the individual subpulse frequencies such as the frequencies 50, 54, 58, 62, and 66 megacycles.

By increasing the length of the transmitted signal in the canonic network while preserving its bandwidth, the time-bandwidth product or pulse compression is increased. During the transmit mode, diode switch 42 is opened by gating signals from gate pulse generator 16 for a longer duration than the duration of staircase waveform, this additional time being equal to the additional pulse width caused by the operation of the canonic network. It should be understood that either of the two outputs of the canonic network 11 can be selected for transmission, and the other output becomes the output terminal on receive. Opposite outputs of the network must be used for transmit and receive so that the quaternary system will perform as a matched filter for the received pulses. The output on line 26 of the canonic network 11 to switch 42 is not used in the transmit mode and is used in the receive mode in order to obtain matched filter operation. The output on line 27 of the canonic network during transmit is applied to a mixer 30 which, in connection with local oscillator 31, beats the frequency up to the desired transmitting frequency. This transmitting signal is applied to a power amplifier 32 which amplifies the signals which are a train of ascending and descending staircase waveforms depending upon the number of elements in the canonic network and the length of a single staircase coming from the input filter. In the present embodiment, a staircase of five steps having a total length of 1.25 microseconds is used and the canonic network consists of five sections. In this instance, then, the transmitted waveform is 40 microseconds in duration. In order to transmit for only this period, a modulator 33 is triggered on by the trigger generator 14. Modulator 33 thus applies operating power to the power amplifier only during the duration of the pulse train. The amplified pulse train is applied to a conventional duplexer 34 and an antenna 35.

After reception of the return pulse train from a reflecting surface, the duplexer applies the received signal to R.F. amplifier 36. Local oscillator 31 beats the output signal from amplifier 36 down to the original intermediate frequency in a conventional mixer 37, and applies this intermediate frequency signal to an I.F. preamplifier 38. The pulse train of ascending and descending stairs is then applied to the input filter 10 by way of a switch 40 which is closed for the duration of the receive mode by the gate pulse generator 16. This return signal is applied to diode gates in the input filter, not shown, to be described in connection with FIG. 3. The individual frequency steps are applied to the same filter components which produced these steps. These components in connection with the canonic network become a matched filter for the received signals which become decoded and compressed to form a single composite output pulse having an amplitude substantially 160 times the amplitude of any subpulse. This is because, in this embodiment of the invention, the input filter provides a five-to-one amplitude increase by producing a simultaneous output through the same filter and resonant elements which initially produced the up-and-down stairs. These five subpulse outputs which appear in phase are stacked or added one upon the other to provide the five-to-one amplitude increase. The individual subpulses are delayed by appropriate delay lines so that each subpulse of the five individual frequencies, say 50, 54, 58, 62, and 66 megacycles, occur simultaneously, and when added in a summing amplifier, produce a center spike of five times the amplitude and one-fifth the width of an individual subpulse. This is because at the time center of the five subpulses, the signals are in phase and add to produce a maximum pulse. However, at other times, the signals are partially out-of-phase and cancel. The amplitude of a received subpulse to the input filter is constant until it reaches its original resonant circuit in which it was generated. It then becomes, by what is termed "autocorrelation," a triangular, enveloped waveform. Thus, when these triangular waveforms of each subpulse are added, the signal at the time center of each subpulse is in phase and, as noted, produces a maximum pulse at the center. The outer portions of each triangular pulse, have less amplitude and when in phase, add to produce side lobes of smaller amplitude. The envelope of each output pulse of the input filter resembles a sine $X/X$ curve. Each ascending or descending staircase fed into the input filter produces this sine $X/X$-like pulse or envelope at the output of the input filter and each of the output lines 18 and 20 thus carries a succession of these sine $X/X$-like envelopes corresponding to the succession of the ascending and descending stairs applied to the input filter.

During this receiving mode, the output of the input filter on line 18 is supplied to the phase inverter 24 which inverts the phase of each of the subpulse frequencies prior to their application to the canonic network by setting diode selector switch 22 to the output of the inverter. For matched filter response, the two output terminals of the input filter are interchanged by diode switches to be described later herein. The canonic network receives by means of switch 22 the inverted signal from line 18 of the input filter and the noninverted direct signal from line 20 of the input filter. In this manner, the components in the canonic network which generated the transmitted waveform are now used to process the waveform in the received mode.

The canonic network 11, in the receiving mode combines a succession of individual narrow sine $X/X$-like pulses which occur in phase in the network to produce a signal composite output pulse on line 26. The amplitude of the composite output pulse is then $2^n$ times the amplitude of the input sine $X/X$-like pulse to the canonic network, where $n$ is the number of sections in the canonic network. In the present embodiment, the amplitude of the sine $X/X$-like wave is five times the amplitude of an individual subpulse and of one-fifth the time duration. Each section of the canonic network, as shown in FIG. 4, doubles the amplitude of the input pulse without changing the pulse width. Thus, in the five-section canonic network shown, the total amplitude gain becomes 32 and the composite pulse in this receiving mode is then 160 times the amplitude of a subpulse at the input to the input filter. The compression ratio, as noted, of the complete system is 800 to 1 when a five-section canonic network, as shown in the present embodiment, is used in connection with a staircase waveform consisting of five separate frequencies. In the present embodiment, the lengths of the individual subpulses are .25 microsecond, the length of a staircase waveform is 1.25 microseconds, the transmitted waveform 40 microseconds, and the final composite output pulse is .05 microsecond in width, thereby giving the 800-to-1 compression ratio.

It should be understood that in accordance with the invention other sections can be added to the canonic network to provide an increased compression ratio without changing the input filter providing the period of the trigger generator is made long enough to accommodate the additional length of the pulse train. For example, a single additional canonic filter section will provide a compression ratio of 1600 to 1. Accordingly, the desired time bandwidth product with its attendant advantages are achieved.

It should be understood that the invention contemplates that the staircase waveform can be used, or totally different waveforms from the input filter can be used. For example, a linearly swept frequency, called a "chirp," can be used in the input filter which is then changed to provide ascending and descending waves devoid of steps. As long as properly correlated ascending and descending waveforms are fed to the canonic network, cancellation of spurious pulses and undesired uncancelled pulses known as "hash" is achieved. This correct correlation consists of the following constraints on the waveforms generated by the input filter: The autocorrelation function of one of the two input filter waveforms must be equal to the autocorrelation function of the other input filter waveform and the cross correlation is substantially less than the autocorrelation of either waveform. Accordingly a filter whose impulse response is a "chirp" or a waveform with linearly swept frequency can be used in connection with the canonic network to produce compression ratios as great as the present embodiment providing the resultant compression ratio in the input filter corresponds to the compression ratio of the input filter used in the present embodiment. However, it should further be understood that the above constraints on the input filter waveforms are required to provide a type of coding and cancellation of spurious pulses which provide the maximum effect in reducing undesired addition of the aforementioned spurious subpulses or "hash." Such coding of the transmitted pulse by the canonic network and input filter results in the referred to quaternary code. The method of producing this particular code will be explained in detail in the present embodiment of the invention.

Referring to FIG. 1, the output from canonic filter 11 on line 26 is applied to an IF amplifier 44 by means of switch 42 which is closed for the period of the echo reception by gate pulse generator 16. The IF post amplifier 44 in the present embodiment is a conventional IF amplifier of 20 megacycles bandwidth and is called "post" IF amplifier to distinguish it from IF preamplifier 38. A conventional M.T.I., or moving target indicator circuit 46 can be used, if desired, for suppression of fixed targets, or it can be omitted and the output of the postamplifier 44 fed directly to a conventional amplitude detector 48 and a conventional indicator appropriate to the desired radar or viewing application. In the present embodiment, a cathode ray tube is used as a viewing scope and connected to line 49 to visually present the final composite output signal.

Figure 3A:
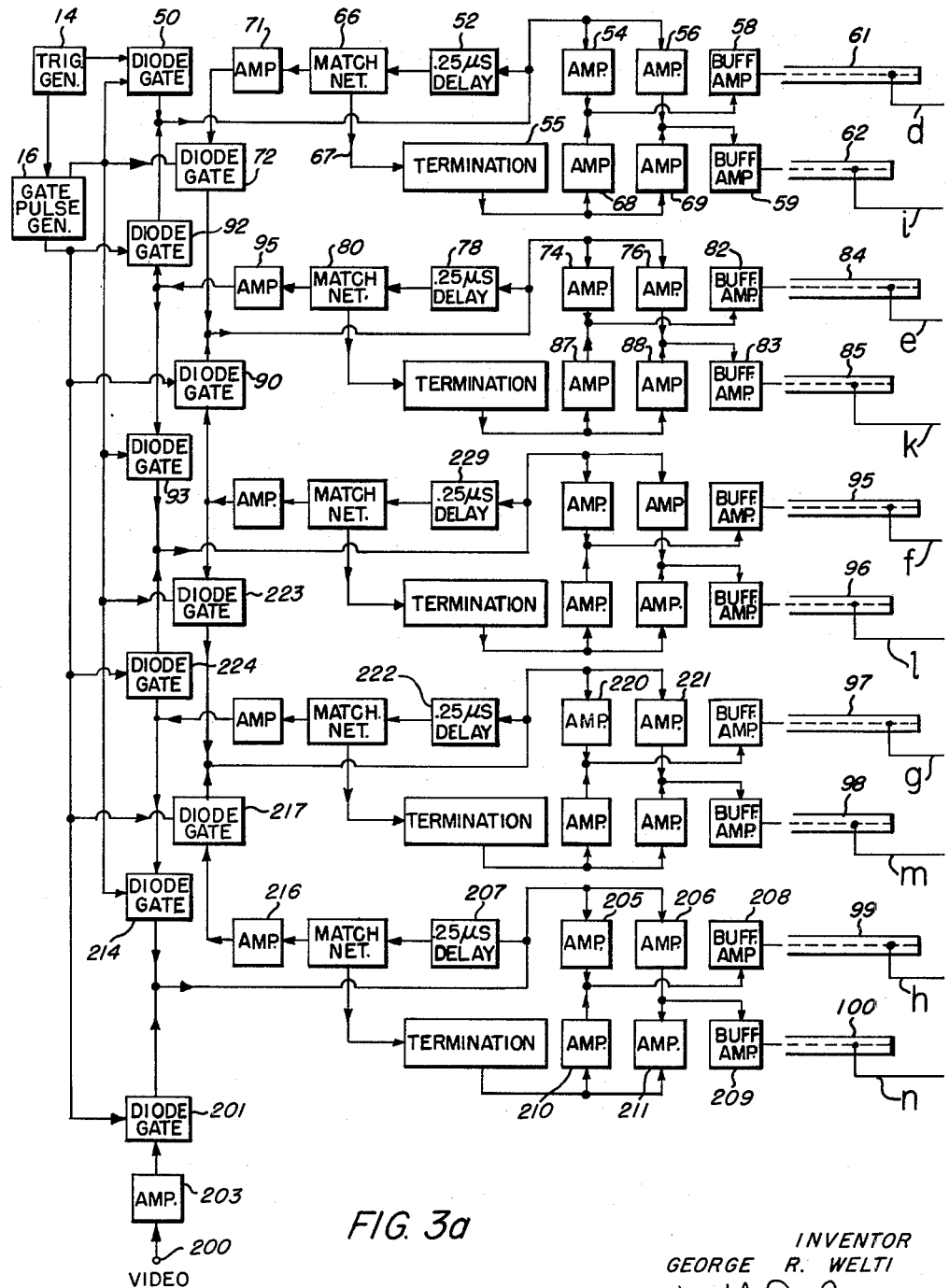
FIG. 3 is a block diagram of the input filter and inverter of the invention.
Figure 3B:
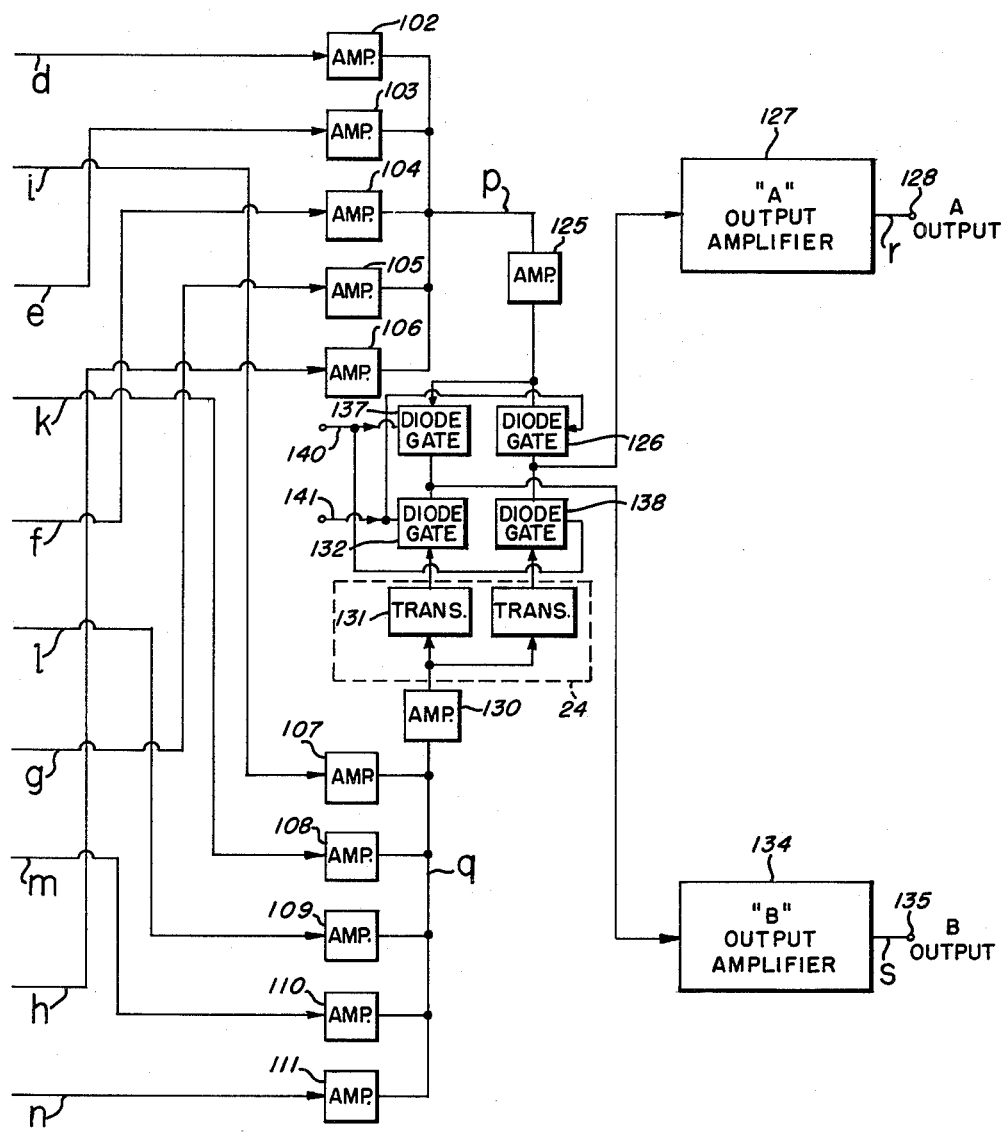

Referring now to FIGS. 2 and 3, the method of producing an ascending and descending staircase waveform for each trigger pulse is shown. Referring, in particular, to FIG. 3, the trigger generator 14 during the transmit mode of operation provides a trigger consisting of a single cycle 60-megacycle sine wave pulse which is applied to a diode switch or gate 50. In the transmit mode, this switch is closed by an appropriate gate from the gate pulse generator 16. Diode switch 50, is functionally represented by switch 15 in FIG. 1 and diode gate 201 of FIG. 3 corresponds to diode switch 40 of FIG. 1. In like manner, diode gates 137, 126, 132 and 138 of FIG. 3 correspond to diode switches 22 of FIG. 1. The appropriate gate from gate pulse generator 16 is initiated by the trigger pulse from trigger generator 14. The trigger pulse is connected through the closed diode switch 50 and is simultaneously applied to a .25 microsecond delay line 52, and to the amplifiers 54 and 56. The trigger pulse applied directly to amplifiers 54 and 56 is fed directly by way of buffer amplifiers 58 and 59 to a pair of subpulse filters such as coaxial resonators 61 and 62. Each coaxial resonator comprises a pair of concentric tubes supported at one end by a disc of low-loss material such as Teflon and at the other end by a metallic short circuiting end cap. The buffer driver 58 and 59 feed the pulse to the center conductor at the Teflon end of resonators 61 and 62 which are cut to a length adapted to provide ringing signals at 50 and 66 megacycles, respectively.

The same input pulse is fed through a delay line 52, such as a conventional coaxial cable of a length to provide a .25 microsecond delay, to a conventional signal-splitting matching network 66, one output of which is connected by line 67 and a conventional coaxial line termination 55 to summing amplifiers 68 and 69. These amplifiers apply the .25 microsecond delayed pulse through buffer amplifiers 58 and 59 to the subpulse filters 61 and 62. However, at the time of application of the delayed pulses, the oscillations of both coaxial resonators are out-of-phase with the delayed pulse and become cancelled by the delayed pulse to terminate ringing. In this manner, the first or 50 megacycle step of the ascending and the first or 66 megacycle step of the descending staircase waveforms are generated. In like manner, the delayed pulse is applied through an amplifier 71 to a diode gate or switch 72, also closed in the transmit mode by gate pulse generator 16. The delayed pulse is then applied to summing amplifiers 74 and 76, delay line 78, and signal splitting matching network 80. Drive amplifiers 82 and 83 initiate ringing in coaxial resonators 84 and 85 at the subpulse frequencies of 54 megacycles and 62 megacycles, respectively. Ringing in these resonators is terminated by the delayed output pulse from the matching network 80 by way of summing amplifiers 87 and 88 and buffer amplifiers 82 and 83. In this manner, the second or 54-megacycle step or subpulse of the ascending and the 62-megacycles step or subpulse of the descending staircase waveforms are generated.

It should be noted that these second steps are delayed one subpulse width or .25 microsecond by the delay line 52 and thus begin at the end of the duration of the first steps. It should be understood that the transmit mode diode switches 90 and 92 are open by the gate pulse generator 16, and diode switches 72 and 93 are closed, so that the delayed trigger pulse is passed on from amplifiers 71 and 95 to their respective summing and delay circuits. In like manner, ringing signals or subpulses, are generated at 58 megacycles by coaxial resonator 95 to form the third step of the ascending staircase waveform and at the same frequency of 58 megacycles by coaxial resonator 96 to form the third step in the descending staircase waveform. Also, frequencies of 62 and 54 megacycles, respectively, are generated by coaxial resonators 97 and 98, and at frequencies of 66 and 50 megacycles by coaxial resonators 99 and 100. The timing of these waveforms is indicated in FIG. 5, waveforms d through n which correspond to the outputs d through n of the respective coaxial resonators. To achieve an output at these frequencies, the outer metallic concentric tubes of approximately 1.1 inches in diameter and the inner concentric tubes are cut to a length which is a quarter wavelength at the particular subpulse frequency. The outputs from the coaxial resonators are extracted from the center conductor near the shorted end of the resonator to reduce loading by subsequent amplifier stages. The five subpulses forming the ascending staircase output are fed to amplifiers 102 through 106 and the subpulses forming the descending stairs are fed to summing amplifiers 107 through 111. These are conventional amplitude-summing amplifiers. The ascending staircase waveform appears at line p and is shown at FIG. 5p. The descending staircase waveform appears at line q and is shown at FIG. 5q.

FIG. 2 shows a block diagram of the quaternary pulse compression system in which the input filter comprises delay lines 115, delay timing circuits 116, subpulse filters 117, filter summing circuits 118 connected to inverter 24 which is operated by diode gating circuits included therein. These diodes switch the inverter in or out of the output circuit and interchange the two output lines on transmit and receive.

Referring to FIG. 3, during transmit mode, the ascending staircase on line *p* is fed through amplifier 125 and diode switch 126 to ascending stair output amplifier 127 referred to as "A" output amplifier, to form the ascending stair output signal, as shown at FIG. 5, at terminal 128. This terminal is connected to the canonic network. Also during transmit mode, the descending staircase waveform at *q* is fed through amplifier 130, a unity gain non-inverting transformer 131 and diode switch 132 to descending stair output amplifier 134 referred to as "B" output amplifier. This descending staircase output appears at terminal 135 and is shown at FIG. 5s. Diode switches 137 and 138 are maintained open during transmit by a gating signal from gate pulse generator 16 applied to terminal 140 of the inverter, while diode gates 126 and 132 are maintained closed during transmit by a gating signal from gate pulse generator 16 applied to terminal 141. In this manner, the input filter on transmit produces an ascending and descending staircase waveform, as shown in the frequency-versus-time plot of FIG. 6a and FIG. 6b.

Referring again to FIG. 2, these simultaneous descending and ascending staircase waveforms are fed to a delay line 150, and an inverter 151, respectively, in the first section of the canonic network. The output of delay line 150 is fed to a divider network 154 which, as noted, cooperates with inverter 151 to split each input signal into two components which are combined in summing amplifiers 155 and 156 in a manner to be described. The two outputs of this section of the canonic network are fed to succeeding sections, each having twice the delay of the previous section, as shown in FIG. 4, to increase the duration of the original 1.25 microsecond input waveforms to 40 microseconds prior to transmission.

Figure 6:
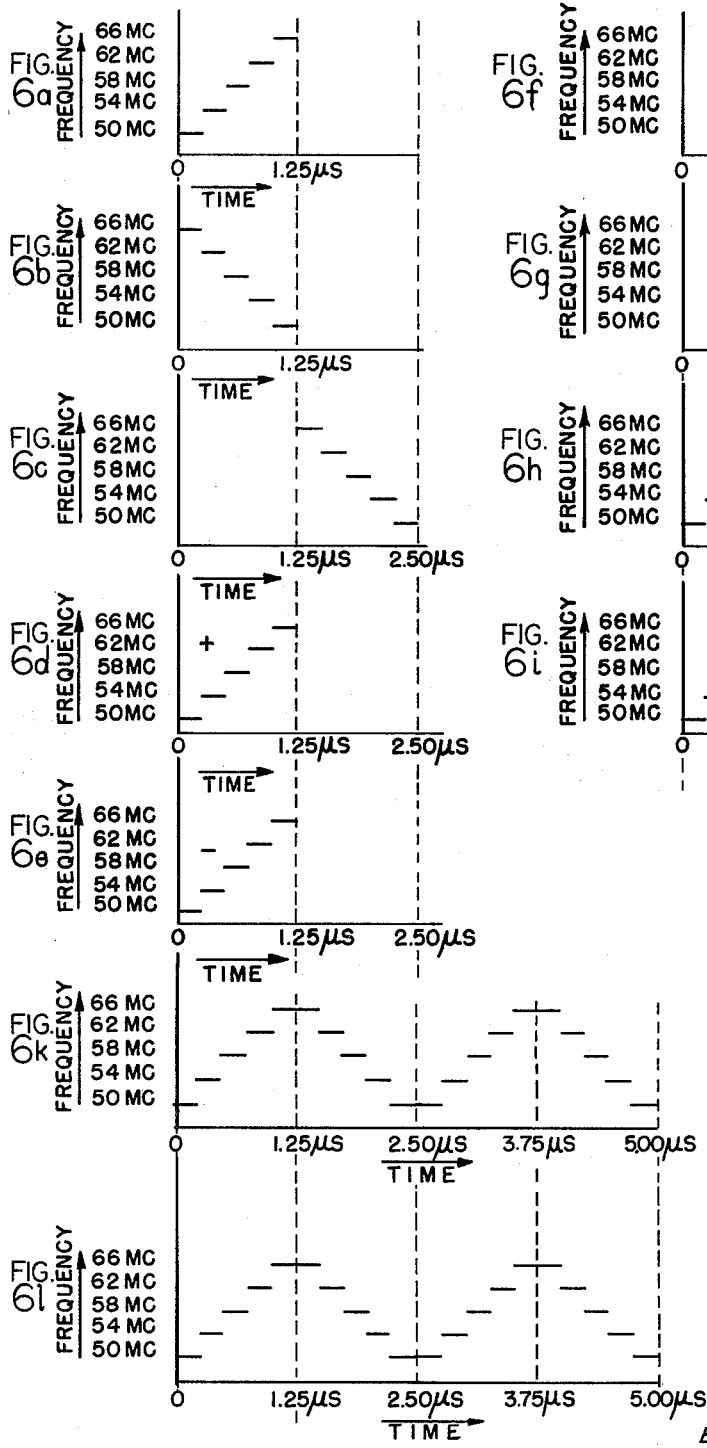
Figure 7:
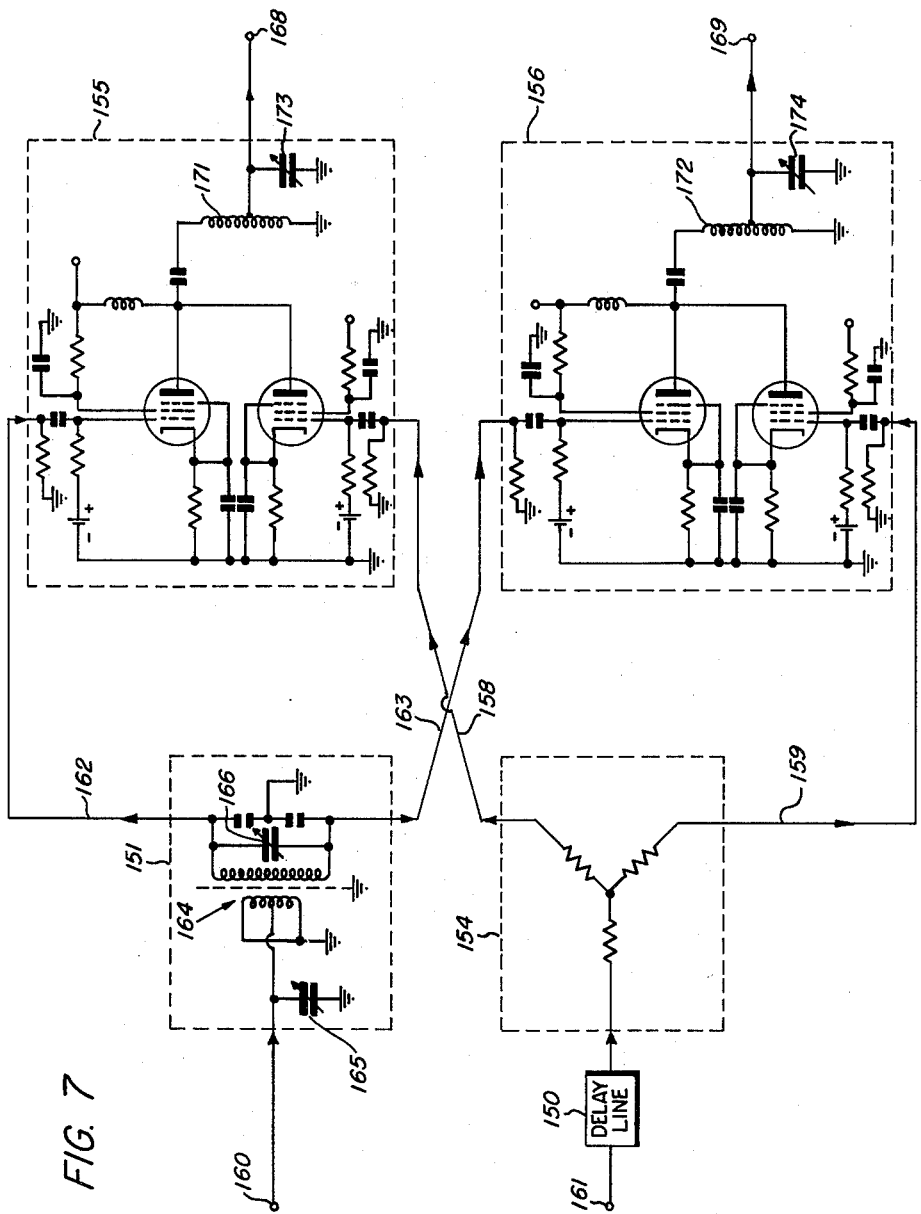
FIG. 7 is a schematic diagram of a single canonic network section.

Referring in particular to FIG. 7, the ascending and descending staircase waveforms, shown at FIGS. 6a and 6b, are applied to terminals 160 and 161 of the canonic network, 11. FIG. 7 shows one section of this canonic network in schematic form. The ascending staircase is applied to inverter 151 and the descending stair is applied through 1.25 microsecond delay line 150 to divider 154 which is composed of three 24-ohm resistors in a star network. This network divides the descending signal into two equal-in-phase staircase components on lines 158 and 159, the timing of which is shown in FIG. 6c. The two outputs on lines 158 and 159 of the inverter section 151 appear the same as that shown in FIG. 6c and are shown in FIG. 6f and FIG. 6g, respectively. However, the phase of the output on line 163 is opposite to the phase of the output on line 162. In particular, the ascending staircase waveform terminal 160 is applied to the primary winding of a wideband phase-splitting transformer 164. The signals appearing at the opposite ends of the secondary winding of the transformer are 180 degrees out-of-phase. The bandpass of the Faraday-shielded transformer 164, preferably, is adjusted by capacitors 165 and 166 to provide maximum flatness of frequency response.

It should be understood that, since the identical canonic network is used to decode the signal as to code it, as shown herein in the transmitting mode, the delay lines and associated circuits need not be adjusted to a precise delay. Accordingly, no delay adjustments are included in the canonic network.

During the transmitting mode, the in-phase descending staircase waveforms on lines 158 and 159, and the ascending waveforms 162 and 163, are applied to the input circuits of the summing amplifiers 155 and 156, respectively. The output of line 163 is 180 degrees out-of-phase with the waveforms on line 162 and terminal 160. Summing amplifier 155 adds the in-phase signals on lines 158 and 162, shown in FIG. 6f and FIG. 6d, respectively, to provide an ascending in-phase staircase followed by a descending in-phase staircase at output terminal 168, as shown in FIG. 6h. In FIG. 6, the symbol (+), written adjacent to a staircase waveform, represents a reference or in-phase waveform, while a symbol (−) represents an out-of-phase waveform. Thus, the waveform signal on line 163 is added to the in-phase waveform on line 159, shown respectively in FIGS. 6e and 6g, to produce an ascending out-of-phase staircase followed by a descending in-phase staircase at output terminal 169, as shown in FIG. 6i. These latter signals are passed on to the succeeding sections of the canonic network where in each section the duration of the output waveform is expanded to double the duration of the input waveform to that section. FIGS. 6k and 6l show the output waveforms of a second section which is identical to the first section except that the delay line, as shown in FIG. 4, provides a delay of twice that of the first section. In this manner, a five-section canonic network provides a succession of thirty-two separate 1.25-microsecond staircase waveforms with selected staircases having had their phase inverted, as shown in FIG. 6m to provide the quaternary code coded waveform for transmission. This transmitted coded waveform is composed of the summation of the out-of-phase and in-phase staircase waveforms from the inverter and divider of the final section of the canonic network. Summing amplifiers 155 and 156 are well-known broad-band amplifiers biased to provide conventional Class A or linear operation, and to feed conventional double-tuned output transformers 171 and 172. Capacitors 173 and 174 are adjusted to provide maximum flatness of frequency response. As shown, the signals are summed in the amplifier plate circuit, and the output capacitance of each amplifier is used to tune the primary of the broadband transformers 171 and 172. It should be understood that, as noted previously, the quaternary code can be produced as long as an odd number of the four signals fed to the summing amplifiers of each section have a phase which is opposite that of the remaining of the four signals. In addition, the delay line in each section need not necessarily precede the divider in each stage and instead can be placed in the line preceding the inverter. FIG. 6m shows a typical ascending and descending staircase waveform which is transmitted in radar applications.

Figure 8:
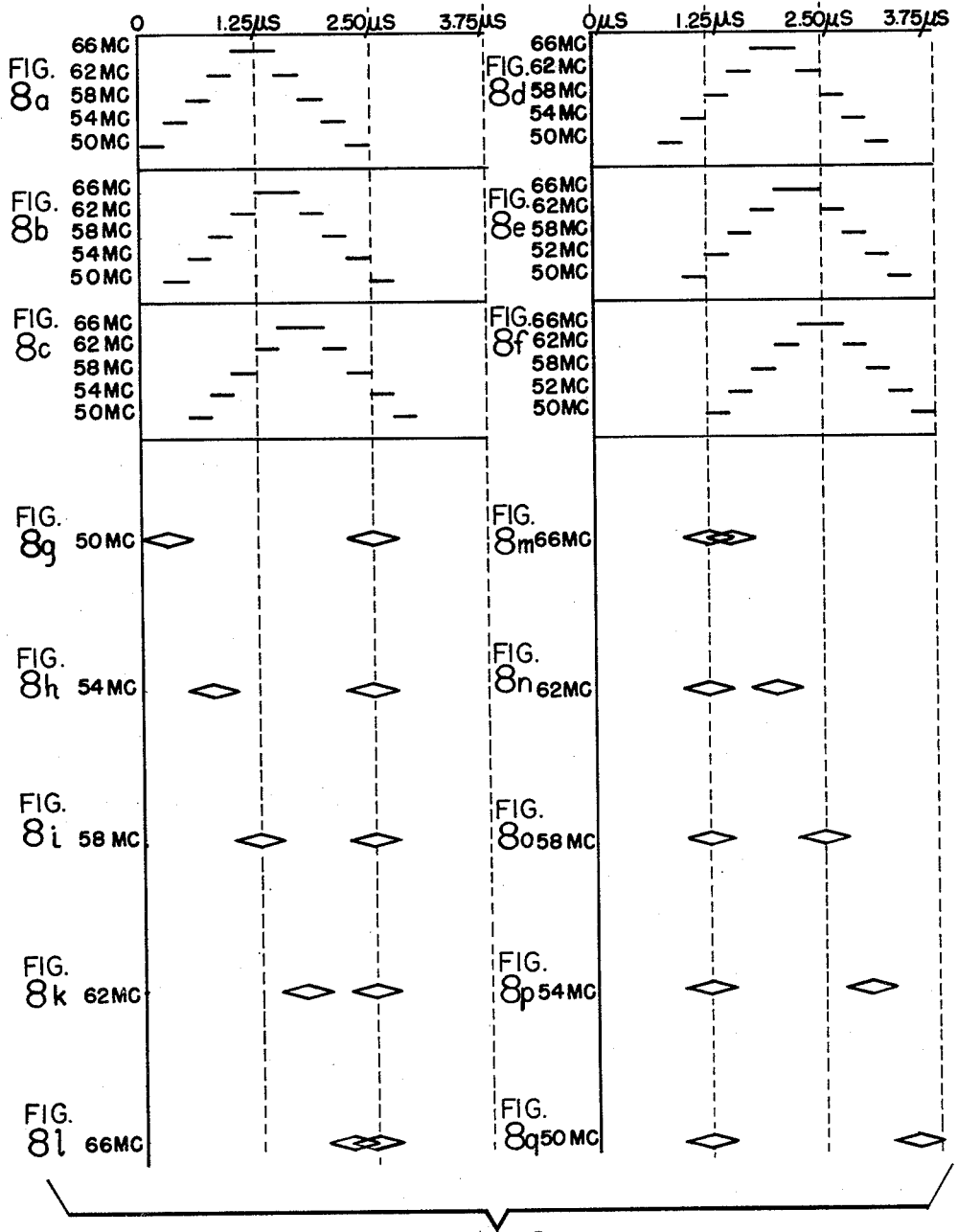
FIG. 8 is a diagram of one pair of the ascending and descending staircase waveforms which is a component of the total received pulse train.

Referring again to FIG. 3, there is shown the input filter, to which is applied during the receiving mode of operation a train of ascending and descending received staircase waveforms at terminal 200, designated "video." This waveform is decoded in the input filter in the following manner: Diode switch 201, corresponding to diode switch 40 in FIG. 1, is closed by a gating signal from gate pulse generator 16. This gating signal is shown in FIG. 5c, which is a positive gate during the receive period, to cause diode switch 201 to conduct in the conventional manner. The echo signal is amplified in amplifier 203. This entire signal, or echo pulse, consists of ascending and descending staircase waveforms of a total length of 40 microseconds, for a five-section canonic network and 1.25 microsecond input staircase. In other words, each return pulse from a reflecting surface consists of this 40-microsecond succession of staircase waveforms for each repetition period of the radar. The entire thirty-two stairs are applied to summation amplifiers 205 and 206, and to delay line 207. However, for descriptive purposes, the operation of the input filter is described in connection with a single ascending and descending staircase. This staircase is shown in FIG. 8a. Each subpulse of the staircase is applied through amplifiers 205 and 206 and conventional buffer amplifiers 208 and 209 to coaxial resonators or subpulse filters 99 and 100. Although the entire ascending and descending staircase is applied to these resonators, an appreciable triangular enveloped ringing signal is produced only at 50 megacycles and 66 megacycles in resonators 100 and 99, respectively. The other subpulses produce substantially negligible signals. During the application of the appropriate subpulses, these oscillations build up linearly because each resonator has a high Q and thus operates as an integration circuit. Accordingly, the oscillations build up in a linear manner until the end of the subpulse. At this time, the delayed subpulse from delay line 207 is applied through amplifiers 210 and 211 and buffer amplifiers 208 and 209 and reaches the ringing coaxial resonators 99 and 100, respectively. This subpulse, which is delayed .25 microsecond in delay line 207, begins at a time which is out-of-phase with the ringing and causes progressive linear decrease in the amplitude of the oscillations to give an oscillating waveform having a triangular envelope. These triangular waveforms occur at 50 megacycles and 66 megacycles as represented symbolically in FIG. 8g for the 50-megacycle subpulses in the ascending and descending waveforms, and in FIG. 8m for the 66-megacycle subpulses in the ascending and descending waveforms. The 66-megacycle subpulses occur in immediate succession due to their occurrence at the top of the ascending and descending staircase shown in FIG. 8a.

During the receive mode, diode switch 214 is open by a gating waveform from the gate pulse generator 16. The delayed subpulse from delay line 207 is also applied through amplifier 216 and diode gate 217 to amplifiers 220, 221, and delay line 222. Ringing occurs in cavity resonators 97 and 98 in the same manner as in resonators 99 and 100 and triangular enveloped 62- and 54-megacycle waveforms, respectively are produced at lines g and m of FIG. 3. These triangular signals are shown in FIG. 8h and 8n corresponding to 54 and 62 megacycles, respectively. In like manner, diodes 223, 93, 72 and 50 are open and diodes 224, 90 and 92 are closed during the receive mode. This permits the initial ascending and descending staircase waveform to progressively cause ringing in the 58-megacycle coaxial resonators 95 and 96, in the 54-and 62-megacycle resonators 84 and 85, and in the 50-and 66-megacycle resonators 61 and 62 to provide triangular output signals shown at FIGS. 8i and 8o, FIGS. 8k and 8p, and FIGS. 8l and 8q respectively. Diode switch 72 is open and prevents further circulation of the initial ascending and descending staircase waveform after completion of ringing in resonators 61 and 62.

Following the ringing of the coaxial resonators, summation amplifiers 107 through 111 combine the outputs of resonators 62, 85, 96, 98, and 100, respectively, and summing amplifiers 102 through 106 combine the outputs from resonators 61, 84, 95, 97, and 99, respectively. These outputs which occur on line q and p of FIG. 3 are shown in FIGS. 8t and 8s, respectively. The vertical stacking of the 50, 54, 58, 62, and 66-megacycle figures occur as shown in FIG. 8t and FIG. 8s to form the waveforms at lines 9 and p of FIG. 3 respectively.

During the receive mode, diode switches 132 and 126 of FIG. 3 are open and diode switches 138 and 137 are closed by gating pulses applied to terminals 141 and 140, respectively, from gate pulse generator 16. The output signals on line q of FIG. 3 are amplified in amplifier 130 and become inverted through a well-known inverting transformer 227 and pass through diode switch 138 to output amplifier 127, the signals on line p pass through amplifier 125 and diode switch 137 to output amplifier 134. The outputs of these amplifiers appear at terminals 128 and 135 of FIG. 3 and are shown at FIGS. 8u and 8v, respectively. The triangular waveforms at FIG. 8u are 180 degrees out-of-phase with those of FIG. 8v. FIGS. 8b through 8f show the single ascending and descending waveform of FIG. 8a being progressively delayed .25 microsecond at delayed outputs of delay lines 207, 222, 229, 78 and 52, respectively. While a single ascending and descending staircase waveform is shown in its travel through the input filter during the receive mode, it should be understood that the remaining series of ascending and descending waveforms, as shown in FIG. 6m, which comprise a single echo from an object, also enter the input filter and each ascending and descending staircase waveform produces outputs similar to FIGS. 8u and 8v, except that portions of the output waveforms may have their phases reversed when the input staircase waveforms have phases different than shown in FIG. 8a. Thus, four combinations of in-and-out-of phase ascending and descending staircase waveforms are possible at the input terminal 200 due to the quaternary coding of the transmitted waveform by the input filter and canonic network. This, in turn, produces in the receive mode for possible pairs of outputs from the input filter on terminals 128 and 135. Thus, as noted, FIGS. 8u and 8v show frequency-versus-time plots of the output signals at terminals 128 and 135, respectively, resulting from a single ascending and descending stair being applied to the input terminal 200. This ascending stair input results in an undesired ascending stair portion of FIG. 8u and the desired vertical portion of FIG. 8v, while the descending stair input at terminal 200 results in the desired vertical portion, or stacked pulses, of FIG. 8u and the undesired descending stair of FIG. 8v. This is due to the selective ringing or decoding of the staircase waveform in the input filter and subsequent summing of the component ringing signals. If the phase of either the ascending or the descending staircase fed to terminal 200 is inverted, as by coding, then the phase of the components of the output signals shown in FIGS. 8u and 8v resulting from this ascending or descending staircase input is inverted. In FIGS. 8u and 8v, the individual subpulse components of the output waveforms are drawn triangular in shape to indicate that the subpulse envelopes are triangular and not to imply that there is a triangular frequency-versus-time deviation, as might be inferred from the drawing. Actually, the individual triangles represent the envelopes of individual carrier frequencies, as shown in the amplitude-versus-time plot of FIG. 8w.

As shown in FIG. 8w, the five triangular subpulses of different frequencies, which occur simultaneously, result in the sine $x/x$-like time waveform shown in FIG. 8w. Also, as noted, in addition to the outputs shown in FIG. 8u and 8v, there are also low-level spurious subpulse components resulting from the application of the entire subpulse train to each coaxial resonator, causing low level output of the resonator. FIG. 8w shows the narrow portion or "spike" of a composite pulse, .05 microsecond at half-amplitude, which is combined with many other similarly generated pulses, in the canonic network to produce the desired composite final output pulse in the canonic network. FIG. 8x shows the pulse at terminal 128 corresponding to the waveform at FIG. 8u and FIG. 8w shows the waveform at terminal 135 and corresponds to FIG. 8v. These two pulse trains contain the amplitude spikes which are added according to the quaternary code in the canonic network to form the final composite output pulse, which is a combination of thirty-two of these spikes. The remaining spikes are completely cancelled in a novel manner, due to the quaternary coding and decoding performed in the canonic network. In this respect, quaternary coding differs from the operation of binary coded pulse compression systems where the aforementioned binary cancellation of undesired subpulses is incomplete.

It should be understood that a succession of in-phase staircase waveforms, two of which are shown in FIG. 8a, results in a succession of output waveforms composed of a repetition of waveforms shown in FIGS. 8u and 8v. However, when the coding network on transmit generates an ascending stair of one phase and descending stair of another phase, the vertical stacked portion of the output waveform appearing at terminal 128 or 135, resulting from the stair having a change in phase, will also have its phase reversed. The canonic network, as noted, can code or generate four possible combinations of phasing in a single set of up and down staircase waveforms at terminal 200 of the input filter. Thus, there are four possible pairs of output waveforms at terminals 128 and 135 for application to the canonic network. These waveforms are shown at FIGS. 8w and 8x, and appear identical except that the phases of the two spikes can be reversed with respect to each other, or the phase of the remaining portions of the two waveforms can be reversed, or both the phase of the spikes and remaining waveforms can be reversed according to coded input at terminal 200.

Referring to FIGS. 2 and 7, the input waveforms at FIGS. 8w and 8x, and a succession of waveforms with portions having inverted phases to comprise the 40-microsecond receive pulse train, are applied to terminals 160 and 161. Since this train is a result of coding in the input filter and canonic network in the transmit mode, and since during the receive mode the input filter and canonic network comprise a matched filter for the received waveform, the components of the pulse train are combined in the canonic network to form the autocorrelation of the received waveform. Thus, while the first input spike and its associated hash, as shown in FIG. 8x, at terminal 161, is delayed by delay line 150, the input spike and its hash from terminal 160 is passed through the network on lines 162 and 163 and amplifiers 155 and 156 to terminals 168 and 169. The only change which occurs to these waveforms is that, due to the phase opposition of the signals on lines 163 and 162, the corresponding outputs at terminals 169 and 168 are out-of-phase. These waveforms are passed on to the next section of the canonic network. However, the second spike on line 160 is fed into inverter 151 at the same time the delayed first spike from line 161 reaches divider 154. Here, the two signals are added in amplifier 155 and subtracted in amplifier 156, and, depending upon the phase of the spikes applied at terminals 160 and 161, a spike of twice the amplitude appears at one of the output terminals, 168 or 169. This spike is fed the remaining sections of the canonic network where it is delayed and combined in a similar manner with other spikes to produce the final composite output signal. However, at the time the double amplitude spike emerges at terminal 168 or 169, depending, as noted, on the phase of the input signals, no spike occurs on the remaining terminal due to cancellation within the canonic section according to the quaternary code used. In this case, the canonic network and input filter forms a matched filter during the receive mode for the received waveform and undesired hash components usually present in binary coded systems are cancelled out. In like manner, the third spike and its hash enters the canonic filter and reaches inverter 151 at the same time the second spike on line 161 has reached divider 154. These two spikes are combined in the former manner to cancel on one output terminal 168 or 169 and to produce on the other output terminal a double amplitude spike of the same width as the spikes at terminals 160 and 161. In like manner, all the succeeding spikes resulting from a single 40-microsecond waveform of ascending descending stairs fed to the input filter, are delayed and combined in this first section of the canonic network. As shown in FIG. 2, the outputs of this section are passed on to the second and succeeding sections of the network to produce a single composite output pulse. Each section doubles the amplitude of the desired spike and total width of the waveform and feeds this waveform to the following sections of the network. The undesired spikes, however, cancel in these sections, so that at the end of the fifth or final section, a composite output spike of a half power width of .05 microsecond results, its amplitude being 32 times the amplitude of the spikes entering the canonic network, assuming, of course, the gain of a canonic section in unity.

The final desired output pulse of the canonic network is 80 microseconds wide with the desired composite pulse centered therein at 40 microseconds and the remaining waveform is low amplitude "hash," due to addition and subtraction of the triangular portions of the waveforms shown in FIGS. 8x and 8w. Since the total transmitted pulse width is 40 microseconds, and since the spike width is .05 microsecond, the desired compression ratio or time band-width product of 800 is achieved with its improved range resolution.

Figure 9:
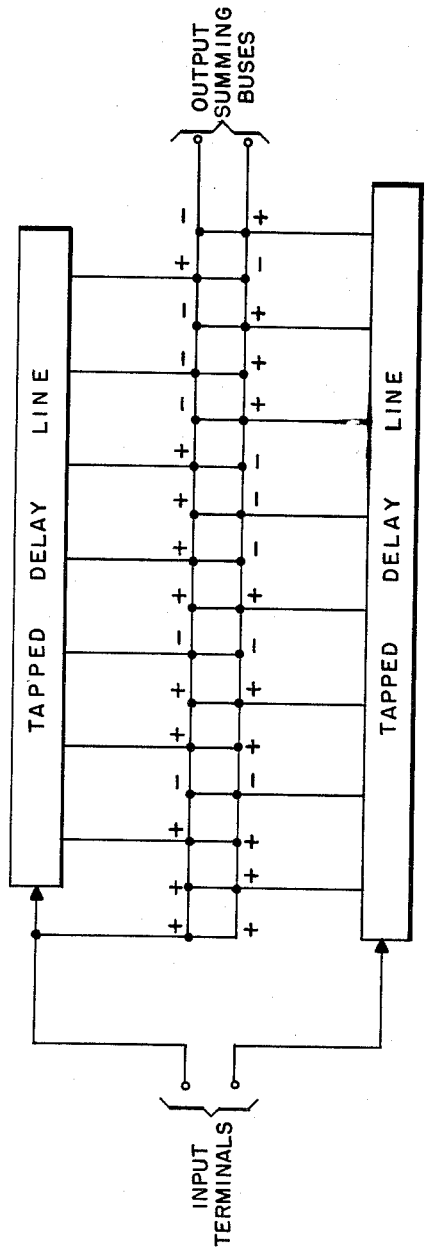
FIG. 9 shows a network which codes an input signal in the manner of the canonic network shown in FIG. 4.

Since the same input filter and canonic network are used to decode during the receive mode as were used to code the signal during transmit, the components of the apparatus are not required to be constructed within the close tolerances necessary when separate coding and decoding devices are used. Thus, any deviation of a delay from nominal values does not result in a distorted output inasmuch as the delay becomes cancelled out during decoding. It should be understood that greater or lesser numbers of canonic network sections can be used independently of the structure of the staircase waveform. Also, as noted, different numbers of steps or entirely different waveforms can be used as long as the aforementioned constraints on the input waveforms are applied. It should be understood that in place of the canonic network other delay line configurations can be used, provided that the input-output waveform relationships are similar to the relationships obtained in the canonic network. That is, any network which physically reproduces the quaternary coded signal in accordance with the aforementioned code construction can be used in place of the canonic network. For example, another network configuration, as shown in FIG. 9, consists of two tapped delay lines fed by the two inputs and a summing bus to which the delay line taps are connected, with or without phase inversion on the individual taps in accordance with quaternary coding principle. In this network input signals to parallel delay lines and summing buses are processed according to a convention established by the coding rules in the same manner as in the canonic network of FIG. 4 except that $2^n$ taps are required where $n$ is the number of sections in the equivalent canonic network. Accordingly, the invention is not to be restricted to the particular network configuration of the embodiment shown in FIG. 4 but the invention includes any apparatus capable of performing the same coding operation to provide the aforementioned cancellation of undesired coding products in accordance with the aforementioned code. Furthermore, the quaternary code can be used in signal systems, including communication systems, using coded waveforms. For example, difficult quaternary codes may be selected for transmission by operating double-pole, double-throw switches in each of the cross branches of the network shown in FIG. 4.

What is claimed is:

1. A pulse compression system comprising means for generating a plurality of sequences of successive signals of alternately increasing and decreasing frequencies, the autocorrelation of said increasing sequences of said signals being equal to that of said decreasing sequences of said signals, the crosscorrelation of said increasing and decreasing sequences being substantially less than the autocorrelation of either of said sequences, means for transmitting said sequences, means for receiving said sequences, and means for progressively summing said sequences so that the third quarter of said sequences is identical to the first quarter, and the fourth quarter is the negative of the second quarter of said sequences.

2. A pulse compression system comprising means for generating a plurality of sequences of successive signals of increasing and decreasing frequencies, the autocorrelation of said increasing sequences of signals being equal to that of said decreasing sequences of signals, and the crosscorrelation of said increasing and decreasing sequences being substantially less than the autocorrelation of either of said sequences, and means for providing that said plurality of sequences of signals of increasing frequency alternate with said plurality of sequences of signals of decreasing frequency.

3. A signal system comprising means for generating signal energy, means for progressively deriving from said signal energy sequences of symmetrically varying frequencies, and means for progressively delaying and inverting predetermined sequence of said frequencies to provide a coded signal.

4. A signal system comprising means for generating a pulse of electrical energy, means for progressively deriving from said pulse symmetrically varying frequencies, and means for progressively processing predetermined sequences of said frequencies to provide a coded series of signals, said latter means providing that the third part of said coded series is the negative of the first part and the fourth part of said coded series is identical to the second part.

5. A signal system comprising means for generating a pulse of electrical energy, means for deriving from said pulse a plurality of sequences of successive subpulses of increasing and decreasing frequencies, each of said frequencies differing from the other by a fixed amount, means for progressively delaying and inverting predetermined sequences of subpulses of said increasing and decreasing frequencies to provide a coded series of signals, means for applying said coded series of signals to said second-recited means to sum selected portions of said coded series, means for inverting said summed signals, and means for recirculating said inverted and noninverted subpulses through said third-recited means to combine said summed signals into a composite pulse.

6. A signal system comprising means for generating signal energy, means for deriving from said signal energy symmetrically varying frequencies, means for selectively inverting and delaying said frequencies, and means for combining said delayed and inverted signals into a composite signal.

7. A signal device comprising means for generating an electrical signal, means for producing from said signal a waveform the characteristic of which varies with time and having four successive parts of equal duration, the third part of said waveform being identical to the first part, and the fourth part being the negative of the second part.

8. A signal device comprising means for generating an electrical signal, means for deriving from said signal an amplitude-time waveform having four successive parts of equal duration, the third part of said waveform being the negative of the first part, and the fourth part of said waveform being identical to the second part.

9. A signal device comprising means for generating an electrical signal, means for deriving from said signal a waveform having a characteristic which varies with time and having four successive parts of equal duration, the third part of said waveform being the negative of the first part, and the fourth part of said waveform being identical to the second part, and the first and second parts of said waveform being the time inverse of each other.

10. A signal device comprising means for generating an electrical pulse, means for deriving from said pulse an amplitude-time waveform having four successive parts of equal duration, the third part of said waveform being the negative of the first part, and the fourth part of said waveform being identical to the second part, the first and second parts of said waveform being the time inverse of each other and having a crosscorrelation the peak amplitude of which is substantially less than the peak amplitude of the autocorrelation function of the first part.

11. A signal device comprising means for generating an electrical pulse, means for deriving from said pulse a plurality of sequences of alternately ascending and descending staircase frequency waveforms, means including a single section of a network for delaying one staircase frequency waveform with respect to the other staircase frequency waveform, means for providing the sum and difference signals of the delayed and nondelayed staircase waveforms, and means for feeding said sum and difference signals to additional sections of said network to provide a composite pulse.

12. A signal device comprising means for generating an electrical pulse, means for deriving from said pulse a plurality of sequences of alternately ascending and descending staircase frequency waveforms, means including a single section of network for delaying one staircase waveform with respect to the other staircase frequency waveform, means for providing the sum and difference signals of the delayed and non-delayed staircase frequency waveforms, and means for feeding said sum and difference signals to the additional sections of said network to provide a composite pulse, wherein each successive section of said network provides twice the time delay of the preceding section.

13. In combination, means for generating a sequence of alternately ascending and descending staircase frequency waveforms, means for adding said waveforms in phase, means for combining one of said waveforms with the inverse of the other of said waveforms, and means for providing a signal which is the amplitude difference of said waveforms including means for adding said waveforms out-of-phase.

14. A signal transmitting and receiving system comprising a source of signals, means for deriving from said source of signals sequences of signals of differing frequency which may be represented by ascending and descending staircase waveforms as a function of time, means comprising a plurality of delay elements for providing a predetermined repetition of each signal of said sequence of signals, said latter means inverting selected sequences of signals to provide a coded train of signals, means for transmitting said coded train of signals, means for receiving said coded train of signals, means including said first-recited means for converting said coded train of signals into a plurality of output pulses of greater amplitude than a single signal of said sequences of signals, and means including said plurality of delay elements to combine selected output pulses into a composite pulse.

15. A system for transmitting and receiving signals comprising means including a plurality of delay elements for generating a plurality of coded signals having a predetermined bandwidth, means for transmitting said signals, means for receiving said signals, and means cooperating with said signal-generating means to compress said received signals according to a compression ratio which varies as $2^n$, where $n$ is the number of delay elements in said signal-generating means.

16. A signal system comprising means for producing a signal, means for deriving from said signal a plurality of subpulse signals occurring in a predetermined frequency sequence, means for producing the time inverse of selected subpulse signals according to a code in which the third part of said sequence of subpulse signals is the negative of the first part of said sequence, and the fourth part of said sequence is identical to the second part.

17. A signal system comprising means for generating an energy pulse, means for deriving from said pulse a waveform having a characteristic which varies with time, means for inverting said waveform, means for adding in phase said inverted and non-inverted waveforms, means for combining one of said waveforms with the inverse of the other of said waveforms, and means for providing the amplitude difference of said waveforms including means for adding said waveforms out-of-phase.

18. A signal system comprising means for generating a pulse of electrical energy, means for progressively filtering said pulse to provide a plurality of sequences of successive subpulses of alternating increasing and decreasing frequencies, each of said frequencies differing from the other by a fixed amount, means for progressively delaying and inverting predetermined sequences of subpulses of increasing and decreasing frequency to provide a coded series of signals, means for applying said coded series of signals to said filter means for delaying and summing selected portions of said coded series of signals, means for inverting said summed signals, and means for recirculating said inverted and non-inverted signals through said first-recited inverting means to combine said summed signals into a composite pulse.

19. In combination, means for generating a sequence of alternately ascending and descending staircase frequency waveforms, means for delaying the ascending frequency stairs an even number of stair lengths, means for delaying the descending frequency stairs an odd number of stair lengths, and means for inverting the phase of predetermined delayed stairs to produce a composite pulse.

References Cited in the file of this patent

UNITED STATES PATENTS

| | | |
|---|---|---|
| 2,403,561 | Smith | July 9, 1943 |
| 2,525,328 | Wolff | Oct. 10, 1950 |
| 2,624,876 | Dicke | Jan. 6, 1953 |
| 2,678,997 | Darlington | May 18, 1954 |
| 2,753,448 | Rines | July 3, 1956 |

OTHER REFERENCES

Cook: Pulse Compression—Key to More Efficient Radar Transmission. Proceedings of the IRE, vol. 48, No. 3 March 1960, pp. 310–316. (Copy in Scientific Library and in Div. 44—343—17.2.)

UNITED STATES PATENT OFFICE
CERTIFICATE OF CORRECTION

Patent No. 3,156,914                            November 10, 1964

George R. Welti

It is hereby certified that error appears in the above numbered patent requiring correction and that the said Letters Patent should read as corrected below.

Column 3, lines 16, 25 and 29, for "a b a b a b", in italics, each occurrence, read -- a b $\underline{a}$ b $\underline{a}$ b $\underline{a}$ $\underline{b}$ --, in italics; line 34, for "a b a b a b", in italics, read -- a b $\underline{a}$ b a b $\underline{b}$ --, in italics; lines 50 and 51, the codes should appear as shown below instead of as in the patent:

$$a \ b \ a \ b \ \underline{a} \ \underline{b} \ a \ \underline{b}$$
$$a \ b \ \underline{a} \ b \ a \ b \ \underline{a} \ \underline{b}$$
$$1-1$$

column 8, lines 49 and 50, for "d", each occurrence, read -- $\underline{d}$ --; same lines 49 and 50, for "n", each occurrence, read -- $\underline{n}$ --; same column 8, line 64, for "p" read -- $\underline{p}$ --; line 65, for "q" read -- $\underline{q}$ --; column 13, line 53, after "ascending" insert -- and --.

Signed and sealed this 11th day of May 1965.

(SEAL)
Attest:

ERNEST W. SWIDER                            EDWARD J. BRENNER
Attesting Officer                          Commissioner of Patents